United States Patent
Lee et al.

(10) Patent No.: US 10,880,798 B2
(45) Date of Patent: Dec. 29, 2020

(54) TECHNIQUES FOR MODE SELECTION AND CELL SELECTION/RESELECTION

(71) Applicant: QUALCOMM Incorporated, San Diego, CA (US)

(72) Inventors: Kuo-Chun Lee, San Diego, CA (US); Srinivasan Balasubramanian, San Diego, CA (US); Arvind Santhanam, San Diego, CA (US); Leena Zacharias, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 89 days.

(21) Appl. No.: 16/103,997

(22) Filed: Aug. 16, 2018

(65) Prior Publication Data
US 2019/0069205 A1 Feb. 28, 2019

Related U.S. Application Data

(60) Provisional application No. 62/551,190, filed on Aug. 28, 2017.

(51) Int. Cl.
*H04W 36/00* (2009.01)
*H04W 36/14* (2009.01)
(Continued)

(52) U.S. Cl.
CPC ..... *H04W 36/00835* (2018.08); *H04W 36/14* (2013.01); *H04W 48/20* (2013.01);
(Continued)

(58) Field of Classification Search
CPC .......... H04W 36/00835; H04W 36/14; H04W 36/36; H04W 48/12; H04W 48/20; H04W 88/06
See application file for complete search history.

(56) References Cited

U.S. PATENT DOCUMENTS

2017/0332284 A1\* 11/2017 Nenner ............. H04W 36/0061
2018/0027460 A1\* 1/2018 Zhang ................... H04W 36/20
455/437
(Continued)

FOREIGN PATENT DOCUMENTS

| EP | 2981134 A1 | 2/2016 |
|---|---|---|
| WO | WO-2017062244 A1 | 4/2017 |
| WO | WO-2018015540 A1 | 1/2018 |

OTHER PUBLICATIONS

Cell selection for NR non-standalone and NR standalone UE operation Huawei 3GPP TSG-RAN WG2 meeting 96—R2-168569 Nov. 2016 (Year: 2016).\*

(Continued)

*Primary Examiner* — Rina C Pancholi
(74) *Attorney, Agent, or Firm* — Arent Fox, LLP

(57) ABSTRACT

Various aspects described herein relate to techniques for operating mode and cell selections and reselections in wireless communications. In an aspect, the method includes determining that a user equipment (UE) is in an idle mode, and receiving, by the UE, system information from one or more candidate cells including at least a Long Term Evolution (LTE) candidate cell or a New Radio (NR) candidate cell. The method further includes selecting or reselecting, by the UE, a cell from the one or more candidate cells to be camped on and an operating mode from an LTE mode, a Standalone (SA) mode, or a Non-standalone (NSA) mode, based on at least the received system information.

30 Claims, 10 Drawing Sheets

(51) Int. Cl.
H04W 48/20 (2009.01)
H04W 88/06 (2009.01)
H04W 36/36 (2009.01)
H04W 48/12 (2009.01)

(52) U.S. Cl.
CPC ............ H04W 36/36 (2013.01); H04W 48/12 (2013.01); H04W 88/06 (2013.01)

(56) References Cited

U.S. PATENT DOCUMENTS

2018/0041953 A1    2/2018  Lindoff et al.
2019/0297562 A1*   9/2019  Wei ...................... H04W 76/27

OTHER PUBLICATIONS

Camping in NR Ericsson 3GPP TSG RAN WG2 NR-AH#2 R2-1706636 Jun. 2017 (Year: 2017).*
"3rd Generation Partnership Project; Technical Specification Group Radio Access Network; Study on New Radio Access Technology; Radio Access Architecture and Interfaces (Release 14)", 3GPP Draft; RP-162255_TR 38 801 V100, 3rd Generation Partnership Project (3GPP), Mobile Competence Centre; 650, Route Des Lucioles; F-06921 Sophia-Antipolis Cedex; France, Dec. 4, 2016, XP051183666, 72 pages, Retrieved from the Internet: URL: http://www.3gpp.org/ftp/Meetings_3GPP_SYNC/RAN/Docs/ [retrieved on Dec. 4, 2016].
Deutsche Telekom AG: "5G Architecture Options—full set," 3GPP Draft; SP-160464_RP-161266, 3rd Generation Partnership Project (3GPP), Mobile Competence Centre; 650, Route Des Lucioles; F-06921 Sophia-Antipolis Cedex; France, No. Busan; Jun. 14, 2016, Jun. 16 2016, XP051108719, 11 pages, Retrieved from the Internet: URL: http://www.3gpp.org/ftp/Meetings_3GPP_SYNC/SA/Docs/ [retrieved on Jun. 16, 2016] p. 2-p. 8.
Ericsson: "Camping in NR," 3GPP Draft; R2-1706636—Camping in NR, 3rd Generation Partnership Project (3GPP), Mobile Competence Centre; 650, Route Des Lucioles; F-06921 Sophia-Antipolis Cedex; France, vol. RAN WG2, No. Qingdao; Jun. 27, 2017-Jun. 29, 2017, Jun. 26, 2017, XP051301138, 4 pages, Retrieved from the Internet: URL: http://www.3gpp.org/ftp/Meetings_3GPP_SYNC/RAN2/Docs/ [retrieved on Jun. 26, 2017] paragraph [02.2]—paragraph [02.4].
Huawei: "Cell Selection for NR Non-Standalone and NR standalone UE Operation," 3GPP Draft; R2-168569 Cell Selection for NR Non-Standalone and NR Standalone UE Operation, 3rd Generation Partnership Project (3GPP), Mobile Competence Centre; 650, Route Des Lucioles; F-06921 Sophi, vol. RAN WG2, No. Reno, Nevada, US; Nov. 14, 2016-Nov. 18, 2016, Nov. 13, 2016, XP051178144, 39 pages, Retrieved from the Internet: URL: http://www.3gpp.org/ftp/Meetings_3GPP_SYNC/RAN2/Docs/ [retrieved on Nov. 13, 2016] paragraph [0001]-paragraph [0003 ].
International Search Report and Written Opinion—PCT/US2018/047106—ISA/EPO—dated Nov. 26, 2018.
Qualcomm Incorporated et al: "Indication NR is Available to Use," 3GPP Draft; S2-174466-23401CR-NR Restriction-R3, 3rd Generation Partnership Project (3GPP), Mobile Competence Centre; 650, Route Des Lucioles; F-06921 Sophia-Antipolis Cedex; France, vol. SA WG2, No. San Jose Del Cabo, Mexico; Jun. 26, 2017-Jun. 30, 2017, Jun. 25, 2017, XP051303314, Retrieved from the Internet: URL: http://www.3gpp.org/ftp/Meetings_3GPP_SYNC/SA2/Docs/ [retrieved on Jun. 25, 2017] Reason for change, Summary of change, paragraph [4.3.2a].
Qualcomm Incorporated: "Principles for Connectivity between eLTE and NGC," 3GPP Draft; 311_R3_170169_ELTE Coccectivity_NGC, 3rd Generation Partnership Project (3GPP), Mobile Competence Centre; 650, Route Des Lucioles; F-06921 Sophia-Antipolis Cedex; France, vol. RAN WG3, No. Spokane, USA; Jan. 17, 2017-Jan. 19, 2017, Jan. 12, 2017, XP051212813, 2 Pages, Retrieved from the Internet: URL: http://www.3gpp.org/ftp/Meetings_3GPP_SYNC/RAN3/Docs/ [retrieved on Jan. 12, 2017] paragraph [0002].

* cited by examiner

| Network(s) in coverage | Does LTE SIB have "5G available"? | Does NR MIB have "not-campable" flag? | UE behavior |
|---|---|---|---|
| LTE only | Yes | -- | Select LTE cell with NSA mode |
| LTE only | No | -- | Select LTE cell with LTE mode |
| NR only | -- | Yes | Continue to search 4G and/or 5G cells |
| NR only | -- | No | Select NR cell with SA mode |
| LTE and NR | Yes | Yes | Select LTE cell with NSA mode |
| LTE and NR | No | Yes | Select LTE cell with LTE mode |
| LTE and NR | Yes | No | Either NSA or SA mode is allowed, need additional considerations |
| LTE and NR | No | No | Select NR cell with SA mode |

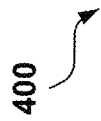

FIG. 4

| Current Mode | Target Cell | Does Target LTE SIB have "5G available"? | Does Target NR MIB have "not-campable" flag? | UE behavior |
|---|---|---|---|---|
| NSA Mode (camped on LTE) | LTE | Yes | -- | Reselect to LTE with NSA mode |
| | LTE | No | -- | Reselect to LTE with LTE mode |
| | NR | -- | Yes | Continue to search 4G and/or 5G cells |
| | NR | -- | No | Reselect to NR with SA mode |
| | LTE and NR | Yes | Yes | Reselect to LTE with NSA mode |
| | LTE and NR | No | Yes | Reselect to LTE with LTE mode |
| | LTE and NR | Yes | No | Reselect to LTE with NSA mode |
| | LTE and NR | No | No | Reselect to NR with SA mode |

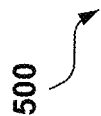

FIG. 5A

| Current Mode | Target Cell | Does Target LTE SIB have "5G available"? | Does Target NR MIB have "not campable" flag? | UE behavior |
|---|---|---|---|---|
| SA Mode (camped on NR) | LTE | Yes | -- | Reselect to LTE with NSA mode |
| | | No | -- | Reselect to LTE with LTE mode |
| | NR | -- | Yes | Continue to search 4G and/or 5G cells |
| | | -- | No | Reselect to NR with SA mode |
| | LTE and NR | Yes | Yes | Reselect to LTE with NSA mode |
| | | No | Yes | Reselect to LTE with LTE mode |
| | | Yes | No | Reselect to NR with SA mode |
| | | No | No | Reselect to NR with SA mode |
| LTE Mode (camped on LTE) | LTE | Yes | -- | Reselect to LTE with NSA mode |
| | | No | -- | Reselect to LTE with LTE mode |
| | NR | -- | Yes | Continue to search 4G and 5G |
| | | -- | No | Reselect to NR with SA mode |
| | LTE and NR | Yes | Yes | Reselect to LTE with NSA mode |
| | | No | Yes | Reselect to LTE with LTE mode |
| | | Yes | No | Need to compare NSA vs SA mode, and additional considerations |
| | | No | No | Reselect to NR with SA mode |

FIG. 5B

| Current Mode | Target Cell | Does Target LTE SIB have "5G available"? | Does Target NR MIB have "not campable" flag? | UE behavior |
|---|---|---|---|---|
| NSA Mode (camped on LTE) | LTE | Yes | -- | Reselect to LTE with NSA mode |
| | LTE | No | -- | Reselect to LTE with LTE mode |
| | NR | -- | Yes | Continue to search 4G and/or 5G |
| | NR | -- | No | Reselect to NR with SA mode |
| | LTE and NR | Yes | Yes | Reselect to LTE with NSA mode |
| | LTE and NR | No | Yes | Reselect to LTE with LTE mode |
| | LTE and NR | Yes | No | Need to compare NSA vs SA mode, and additional considerations |
| | LTE and NR | No | No | Reselect to NR with SA mode |

FIG. 6A

TECHNIQUES FOR MODE SELECTION AND CELL SELECTION/RESELECTION

CROSS-REFERENCE TO RELATED APPLICATION(S)

This application claims the benefit of U.S. Provisional Application Ser. No. 62/551,190, entitled "TECHNIQUES FOR MODE SELECTION AND CELL SELECTION/RESELECTION" and filed on Aug. 28, 2017, which is expressly incorporated by reference herein in its entirety.

BACKGROUND

Aspects of the present disclosure relate generally to wireless communications systems, and more particularly, to techniques for mode selection and cell selection/reselection procedures in wireless communications systems (e.g., a 4G system and/or a 5G New Radio system).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is the 4th Generation (4G), which includes Long Term Evolution (LTE) and/or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communications systems continues to increase.

The 5th Generation (5G) New Radio (NR) communications technology, used in a wide range of spectrum, is envisaged to expand and support diverse usage scenarios and applications with respect to current mobile network generations. In an aspect, 5G NR communications technology includes, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information. As the demand for mobile broadband access continues to increase, there exists a need for further improvements in 5G communications technology and beyond. Preferably, these improvements should be applicable to other multi-access technologies and the telecommunication standards that employ these technologies.

Accordingly, due to the requirements for increased data rates, higher capacity, and higher system reliability, new approaches or procedures may be desirable to improve user equipment (UE) mobility, cell selections/reselections, and enhance service among 4G and 5G NR networks, by selecting or reselecting a suitable operating mode to access at least one of a 4G network or a 5G NR network, and a proper cell to be camped on, in order to satisfy consumer demand and improve user experience in wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

According to an example, a method related to mode selections and cell selections in a wireless communications system is provided. In an aspect, the method includes determining, by a user equipment (UE), that the UE is in an idle mode, and receiving, by the UE, system information from one or more candidate cells including at least an Long Term Evolution (LTE) candidate cell or a New Radio (NR) candidate cell. The method further includes selecting, by the UE, a cell from the one or more candidate cells to be camped on and an operating mode from an LTE mode, a Standalone (SA) mode, or a Non-standalone (NSA) mode, based on at least the received system information.

In another aspect, a method related to mode reselections and cell reselections in a wireless communications system is provided. In an aspect, the method includes determining that the UE is in an idle mode, and identifying a current operating mode and a current cell being camped on, wherein the current operating mode is an LTE mode, an SA mode, or a NSA mode. The method further includes receiving system information from one or more candidate cells including at least an LTE candidate cell or a NR candidate cell, and reselecting a target cell from the one or more candidate cells to be camped on and an operating mode from the LTE mode, the SA mode, or the NSA mode, based on the received system information.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided and includes code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

FIG. 4 is a table illustrating examples of operating mode and cell selections, according to one or more of the presently described aspects.

FIG. 5A and FIG. 5B are two tables illustrating examples of operating mode and cell reselection schemes, according to one or more of the presently described aspects.

FIG. 6A and FIG. 6B are two tables illustrating additional examples of operating mode and cell reselection schemes, according to one or more of the presently described aspects.

DETAILED DESCRIPTION

Figure 1:
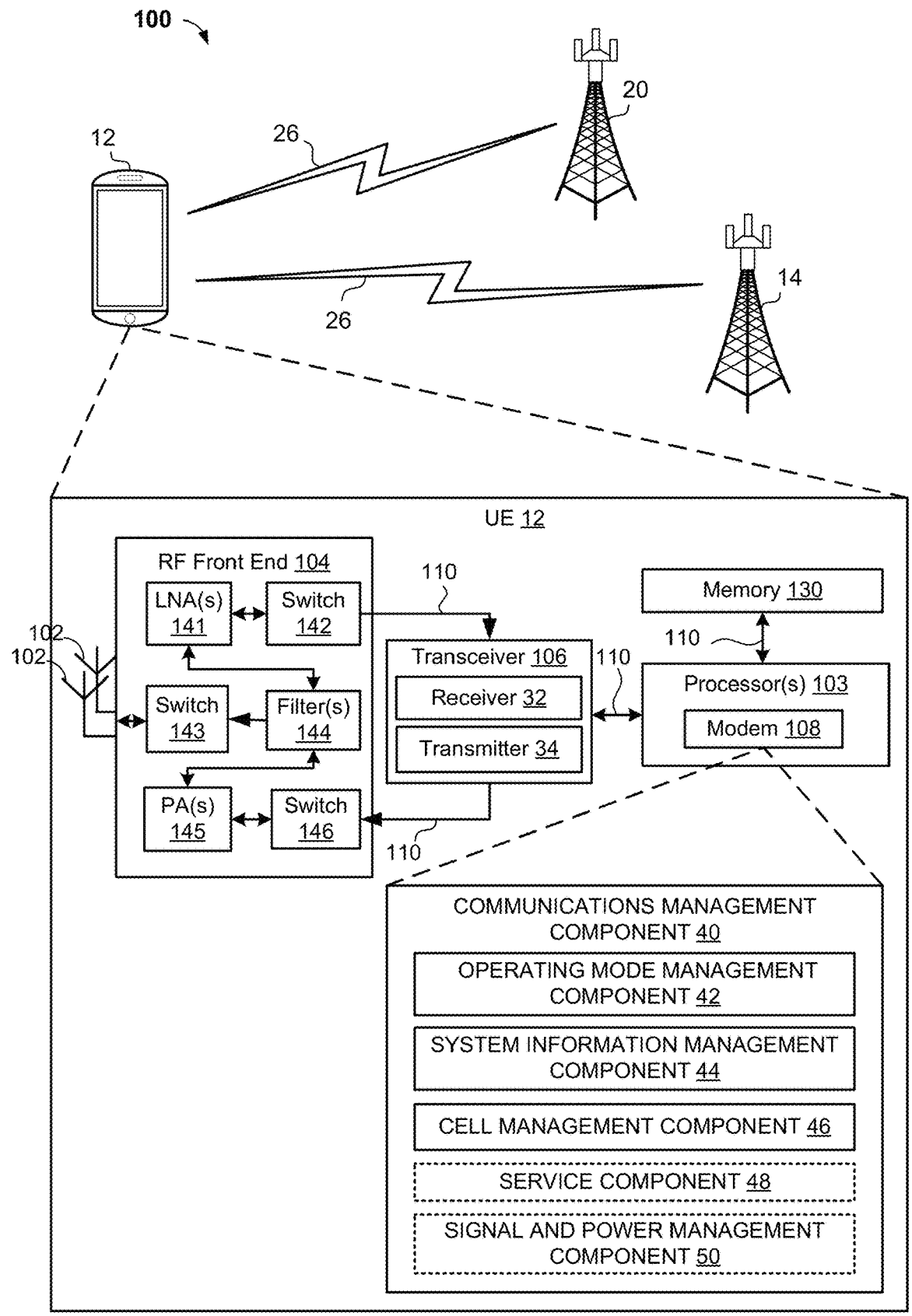
FIG. 1 is a block diagram illustrating a first example of a wireless communications system including a user equipment (UE) communicating with one or more base stations to perform operating mode and/or cell (re)selection procedures, according to one or more of the presently described aspects.

In wireless communications, for example, in a 4th Generation (4G) system (e.g., an Long Term Evolution (LTE) system) and/or a 5th Generation (5G) New Radio (NR) system, a user equipment (UE) may connect to either an LTE cell or a NR cell, or both. In some aspects, the UE may select or be configured to operate in an LTE mode, a Standalone (SA) mode, or a Non-standalone (NSA) mode. For example, the LTE mode may be selected or configured when the UE camps on an LTE cell and no 5G NR cells are available for the UE. In an example, the SA mode may be selected or configured when the UE camps on a 5G NR cell. In other words, in the SA mode, the UE may connect to 5G NR directly. In an example, in the NSA mode, the UE may connect to LTE (e.g., an LTE cell) as a Master Cell Group (MCG) and 5G NR (e.g., a NR cell) as a Secondary Cell Group (SCG) with dual connectivity (DC).

In some examples, a base station (e.g., an eNB in an LTE cell) may broadcast one or more indications (e.g., a "5G available" indication in system information or a system information block (SIB)) indicating the existence of one or more nearby 5G NR cells (e.g., a 5G NR cell that is proximate to the UE) and indicating the capability of the base station to support DC. In some aspects, the base station may send system information including a NR frequency list. In an example, the NR frequency list may be a list of frequencies used and/or supported by one or more 5G NR cells. In some cases, the NR frequency list may be a NR frequency list. In an aspect, in a conventional communications system (e.g., an LTE system), the base station may not signal the NR frequency list in an existing SIB, such as Master Information Block (MIB), SystemInformationBlockTypea (SIB1), and/or SystemInformationBlockType2 (SIB2). In this case, for example, one or more new SIBs (e.g. SIB2N, where N is any number 0-9) may be used to signal or send the NR frequency list and/or information related to the NR frequency list.

In some implementations, in idle mode, the UE may select or operate in an operating mode, for example, an LTE mode, an SA mode, or an NSA mode. In the LTE mode, the UE may camp on an LTE cell, monitor at least the LTE paging messages from the LTE cell, and not display a 5G icon. In an example, the 5G icon may be a signal strength bar displayed on the UE. In the SA mode, the UE may camp on a NR cell, monitor at least the NR paging messages from an NR cell, and displays the 5G icon. In the NSA mode, the UE may camp on an LTE cell, monitor at least the LTE paging messages from the LTE cell, and displays the 5G icon. In some cases, if an NR cell can only be a secondary cell or a SCG when DC is supported or used, MIB (e.g., NR-MIB) may be used to signal or send an indication indicating that the NR cell cannot be camped on. For example, a "not-campable" flag (e.g. cellBarred information element (IE)) may be used and sent (e.g., in the MIB) to the UE to indicate that the NR cell cannot be camped on. In this case, the NSA mode may be selected or used by the UE. In another example, if the indication (indicating that the NR cell cannot be camped on) or the "not-campable" flag (e.g. cellBarred IE="barred") is not included and/or sent to the UE, the NR cell may support the SA mode, and the UE may select the SA mode and/or camp on the NR cell.

In some aspects, a UE may support at least one of an LTE mode, an SA mode, or NSA mode. In an aspect, the UE may only operate in one operating mode at a time. For example, the UE may select or reselect to operate in either the SA mode or the NSA mode, even though the UE may support both the SA mode and the NSA mode. In some examples, the network or cells may support NSA mode UEs and/or SA mode UEs. However, in UE idle mode, there may be issues for choosing an operating mode to access one or more radio access networks (RANs) and selecting/reselecting a cell. For example, a UE may have difficulty choosing which operating mode the UE should use or select, and how to choose a cell (or which cell is suitable to be camped on) in cell selection/reselection. In an example, the UE may select or reselect either the NSA mode or the SA mode if either operating mode can be used, and may select/reselect an LTE cell or a NR cell if at least one of the LTE cell or the NR cell may be camped on. In some cases, when the UE is in idle mode, the UE may select or reselect an LTE cell with the NSA mode, an LTE cell with the LTE mode, or a NR cell with the SA mode.

As such, new or improved approaches or procedures may be desired to making suitable operating mode selections/reselections and cell selections/reselections, in order to more efficiently utilize the services and network bandwidth, and enhance system reliability.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. In some aspects, the computer-readable media may be non-transitory or include a non-transitory computer-readable storage medium.

Described herein are various aspects related to one or more wireless communications systems, for example, a 4G or an LTE system, and/or a 5G NR system. In particular, the various aspects are related to techniques or procedures for selecting or reselecting a suitable operating mode and a suitable cell for a UE to camp on. For example, schemes or procedures for NSA mode or SA mode selection may be employed and used for cell (re)selection. In another aspect, when a cell reselection is triggered, the UE may choose a suitable target cell (e.g., from two or more candidate cells) and/or a suitable operating mode to operate. In some examples, the disclosed techniques or procedures may allow the UE to utilize LTE and/or 5G NR services more efficiently. In some implementations, when the UE is in idle mode, the UE may support at least one operating mode (e.g., an LTE mode, an SA mode, or a NSA mode), and may select or reselect an operating mode based on UE capability and/or system information received from one or more LTE cells and/or 5G NR cells.

Each of the aspects described above may be performed or implemented in connection with FIGS. 1-8, which are described in more detail below.

Referring to FIG. 1, in an aspect, a wireless communication system 100 includes at least one UE 12 in communication with at least one network entity 14 or network entity 20 via wireless communications 26. The UE 12 may communicate with a network via the network entity 14 or network entity 20. In some aspects, multiple UEs including the UE 12 may be in communication coverage with one or more network entities, including the network entity 14 and network entity 20. In an aspect, the network entity 14 or network entity 20 may be a base station, such as an evolved Node B (eNodeB or eNB) in a 4G network or a Next Generation Node B (gNB) in a 5G NR network. Although various aspects are described in relation to a Universal Mobile Telecommunications Service (UMTS), LTE, or a 5G NR network, similar principles may be applied in other wireless wide area networks (WWAN). The wireless network may employ a scheme where multiple base stations may transmit on a channel. In an example, the UE 12 may transmit and/or receive wireless communications (e.g., messages or signals used for operating mode or cell selections/reselections) to and/or from the network entity 14 and/or the network entity 20. For example, the UE 12 may be actively communicating with the network entity 14 and/or the network entity 20, for example, to perform one or more operating mode and/or cell selection or reselection procedures.

In some aspects, the UE 12 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. The UE 12 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for Internet of Things (IoT), or any other similar functioning device.

In some examples, the network entity 14 or the network entity 20 may be referred to as a base transceiver station, a radio base station, a radio transceiver, a basic service set (BSS), an extended service set (ESS), a NodeB, eNodeB, Home NodeB, a Home eNodeB, a gNB or some other suitable terminology. The coverage area for a base station may be divided into sectors making up only a portion of the coverage area (not shown). The wireless communications system 100 may include the network entity 14 and/or the network entity 20 of different types (e.g., macro, micro, and/or pico base stations). The network entity 14 or the network entity 20 may utilize different radio technologies, such as cellular and/or Wireless Local Area Network (WLAN) radio access technologies (RAT). The network entity 14 or the network entity 20 may be associated with the same or different access networks or operator deployments. The coverage areas of the network entity 14 or the network entity 20, including the coverage areas of the same or different types of the network entity 14 or the network entity 20, utilizing the same or different radio technologies, and/or belonging to the same or different access networks, may overlap. Furthermore, the network entity 14 or the network entity 20 may be substantially any type of component that may communicate with UE 12 to provide wireless network access at the UE 12.

According to the present aspects, the UE 12 may include one or more processors 103 and a memory 130 that may operate in combination with a communications management component 40, an operating mode management component 42, a system information management component 44, a cell management component 46, a service component 48, and/or a signal and power management component 50.

In some examples, the communications management component 40 may be configured to perform one or more operating mode and/or cell (re)selection procedures as discussed herein. In an aspect, the operating mode management component 42 may be configured to identify the current operating mode and/or select/reselect a target operating mode from an LTE mode, an SA mode, or an NSA mode. In an aspect, the system information management component 44 may be configured to receive and decode system information (e.g., LTE SIB or NR MIB) and indication(s) from one or more candidate cells. In another aspect, the cell management component 46 may be configured to select or reselect a cell from one or more candidate cells to be camped on. The service component 48 may be configured to determine whether the UE 12 is a voice-centric UE or a data-centric UE. In an aspect, the signal and power management component 50 may be configured to compare signal strengths from multiple candidate cells or power consumptions for camping on as described herein.

In some aspects, the communications management component 40 may be communicatively coupled with a transceiver 106, which may include a receiver 32 for receiving and processing radio frequency (RF) signals (e.g., including MIB and/or SIBs), and a transmitter 34 for processing and transmitting RF signals. The one or more processors 103 may be communicatively coupled with the transceiver 106 and the memory 130 via at least one bus 110.

The receiver 32 may include hardware, firmware, and/or software code executable by a processor for receiving data, the code comprising instructions and being stored in a memory (e.g., memory 130 or computer-readable medium). The receiver 32 may be, for example, an RF receiver. In an aspect, the receiver 32 may receive signals transmitted by the UE 12, one or more other UEs 12 and/or one or more network entities (e.g., network entity 14 or network entity 20). The receiver 32 may obtain measurements of the signals. For example, the receiver 32 may obtain signal measurements, and may be communicatively coupled with the one or more processors 103 and assist the one or more processors 103 to determine one or more signal quality measurements such as signal-to-noise ratio (SNR) or Reference Signal Received Power (RSRP).

The transmitter 34 may include hardware, firmware, and/or software code executable by a processor for transmitting data, the code comprising instructions and being stored in a memory (e.g., memory 130 or computer-readable medium). The transmitter 34 may be, for example, a RF transmitter.

In an aspect, the one or more processors 103 may include a modem 108 that uses one or more modem processors. The various functions related to the communications management component 40 may be included in the modem 108 and/or the one or more processors 103 and, in an aspect, may be executed by a single processor, while in other aspects, different ones of the functions may be executed by a combination of two or more different processors. For example, in an aspect, the one or more processors 103 may include any one or any combination of a modem processor, a baseband processor, a digital signal processor, a transmit processor, or a transceiver processor associated with the transceiver 106. In particular, the one or more processors 103 may implement components included in the communications management component 40, including the operating mode management component 42, the system information management component 44, the cell management component 46, the service component 48, and/or the signal and power management component 50.

The communications management component 40, the operating mode management component 42, the system information management component 44, the cell management component 46, the service component 48, and/or the signal and power management component 50 may include hardware, firmware, and/or software code executable by a processor for performing operating mode and cell (re)selection management and related operations. For example, the hardware may include, for example, a hardware accelerator, or a specialized processor. In an aspect, the term "component" as used herein may be one of the parts that make up a system, may be hardware, firmware, and/or software, and may be divided into other components.

Moreover, in an aspect, the UE 12 may include an RF front end 104 and the transceiver 106 for receiving and transmitting radio transmissions, for example, the wireless communications 26. For example, the transceiver 106 may transmit or receive one or more signals. The transceiver 106 may measure a received pilot signal in order to determine signal quality (e.g., based on RSRP, Reference Signal Received Quality (RSRQ), or Received Signal Strength Indicator (RSSI)) and for providing feedback to the network entity 14 or the network entity 20. For example, the transceiver 106 may communicate with the modem 108 to transmit messages generated by the communications management component 40 and to receive messages and forward them to the communications management component 40.

The RF front end 104 may be communicatively couple with one or more antennas 102 and may include one or more low-noise amplifiers (LNAs) 141, one or more switches 142, 143, 146, one or more power amplifiers (PAs) 145, and one or more filters 144 for transmitting and receiving RF signals. In an aspect, the components of the RF front end 104 may be communicatively coupled with the transceiver 106 (e.g., via one or more communication links or buses 110). The transceiver 106 may be communicatively coupled with one or more or the modem 108 and/or the one or more processors 103.

In an aspect, the LNA 141 may amplify a received signal at a desired output level. In an aspect, each LNA 141 may have a specified minimum and maximum gain values. In an aspect, the RF front end 104 may use one or more switches 142, 143 to select a particular LNA 141 and its specified gain value based on a desired gain value for a particular application. In an aspect, the RF front end 104 may provide measurements (e.g., energy-to-interference ratio (Ec/Io)) and/or applied gain values to the communications management component 40.

The one or more PA(s) 145 may be used by the RF front end 104 to amplify a signal for an RF output at a desired output power level. In an aspect, each PA 145 may have a specified minimum and maximum gain values. In an aspect, the RF front end 104 may use one or more switches 143, 146 to select a particular PA 145 and a specified gain value of the PA 145 based on a desired gain value for a particular application.

The one or more filters 144 may be used by the RF front end 104 to filter a received signal to obtain an input RF signal. Similarly, in an aspect, for example, a respective filter 144 may be used to filter an output from a respective PA 145 to produce an output signal for transmission. In an aspect, each filter 144 may be communicatively coupled with a specific LNA 141 and/or PA 145. In an aspect, the RF front end 104 may use one or more switches 142, 143, 146 to select a transmit or receive path using a specified filter 144, LNA, 141, and/or PA 145, based on a configuration as specified by the transceiver 106 and/or processor 103.

The transceiver 106 may be configured to transmit and receive wireless signals through an antenna 102 via the RF front end 104. In an aspect, the transceiver 106 may be tuned to operate at specified frequencies such that the UE 12 may communicate with, for example, the network entity 14 or the network entity 20. In an aspect, for example, the modem 108 may configure the transceiver 106 to operate at a specified frequency and power level based on the UE configuration of the UE 12 and communication protocol used by the modem 108.

In an aspect, the modem 108 may be a multiband-multimode modem, which may process digital data and communicate with the transceiver 106 such that the digital data is sent and received using the transceiver 106. In an aspect, the modem 108 may be multiband and be configured to support multiple frequency bands for a specific communications protocol. In an aspect, the modem 108 may be multi-mode and be configured to support multiple operating networks and communications protocols. In an aspect, the modem 108 may control one or more components of the UE 12, or the network entities 14 or 20 (e.g., RF front end 104, transceiver 106), to perform operating mode and cell (re)selection procedures or enable transmission and/or reception of signals based on a specified modem configuration. In an aspect, the modem configuration may be based on the mode of the modem and the frequency band in use. In another aspect, the modem configuration may be based on UE configuration information associated with the UE 12 as provided by the network during operating mode and cell (re)selection (or handover).

In some aspects, the UE 12 may further include the memory 130, such as for storing data used herein and/or local versions of applications or the communications management component 40 and/or one or more subcomponents of the communications management component 40 being executed by the one or more processors 103. The memory 130 may include any type of computer-readable medium usable by a computer or processor(s) 103, such as random access memory (RAM), read only memory (ROM), tapes, magnetic discs, optical discs, volatile memory, non-volatile memory, and any combination thereof. In an aspect, for example, the memory 130 may be a computer-readable storage medium that stores one or more computer-executable codes defining the communications management component 40 and/or one or more of the subcomponents of the communications management component 40, and/or data associated therewith, when the UE 12 and/or the network entity 14 or the network entity 20 is operating the one or more processors 103 to execute the communications management component 40 and/or one or more subcomponents of the communications management component 40. In another aspect, for example, the memory 130 may be a non-transitory computer-readable storage medium.

Figure 2:
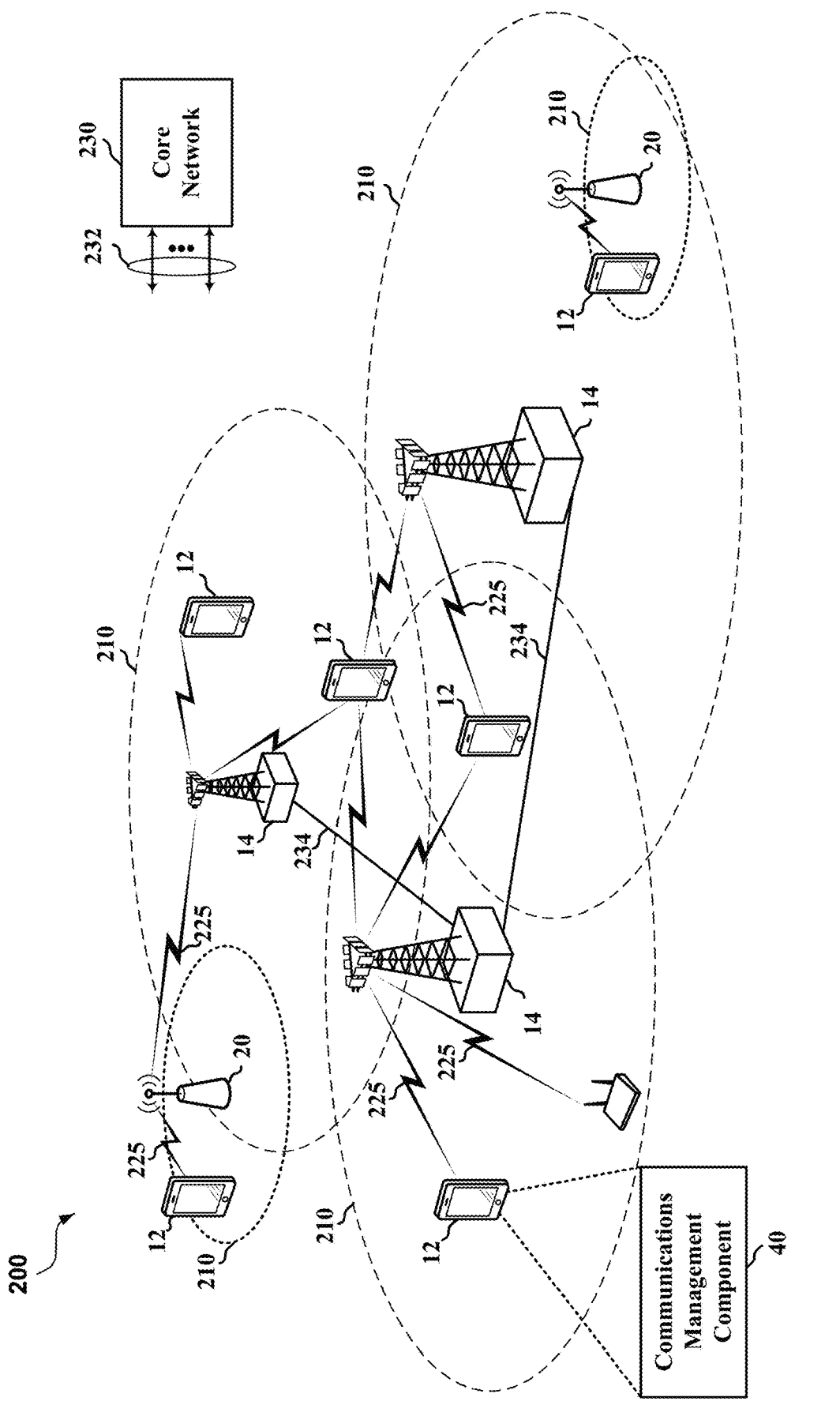
FIG. 2 is a block diagram illustrating a second example of a wireless communications system including multiple UEs for communicating with one or more base stations to perform operating mode and/or cell (re)selection procedures, according to one or more of the presently described aspects.

Referring to FIG. 2, a diagram illustrates an example of a wireless communications system 200, in accordance with aspects described herein. In some examples, the wireless communications system 200 may include the wireless communications system 100 in FIG. 1, and may include a plurality of network entities 14 and/or 20 (e.g., base stations, gNBs, or WLAN network entity), a number of UEs 12, and a core network 230. In an aspect, one or more UEs 12 may include the communications management component 40 configured to manage operating mode and cell (re)selections. The communications management component 40 may be configured to perform at least some aspects of the techniques or methods described above in wireless communications, including 4G or 5G NR. The network entity 14 or the network entity 20 may communicate with the UEs 12 under the control of a base station controller (not shown), which may be part of the core network 230 or the network entity 14 or the network entity 20 (e.g., a base station or a gNB) in various examples.

In an aspect, the network entity 14 or 20 may communicate control or system information and/or user data with the core network 230 through backhaul links 232. In some cases, the network entity 14 or 20 may communicate, either directly or indirectly, with each other over backhaul links 234, which may be wired or wireless communication links. The wireless communications system 200 may support operation on multiple carriers (waveform signals of different frequencies). Multi-carrier transmitters may transmit modulated signals simultaneously on the multiple carriers. For example, each communication link 225 (e.g., wireless communications 26 in FIG. 1) may be a multi-carrier signal modulated according to the various radio technologies described above. Each modulated signal may be sent on a same or different carrier and may carry control or system information (e.g., reference signals, control channels, MIB, SIBs, etc.), overhead information, data, etc.

In some examples, the network entity 14 or 20 may wirelessly communicate with the UEs 12 via one or more antennas. Each of the network entity 14 or 20 may provide communication coverage for a respective coverage area 210. In some examples, the network entity 14 or 20 may be referred to as a base station, a NodeB, an eNodeB, a Home NodeB, a Home eNodeB, a gNB, or an access point. In some cases, at least a portion of the wireless communications system 200 may be configured to operate on a spatial multiplexing (e.g., multiple-input and multiple-output (MIMO)) scheme in which one or more of the UEs 12 and one or more of the network entity 14 or 20 may be configured to support transmissions on closed-loop MIMO and/or open-loop MIMO scheme.

In network communication systems using 4G (e.g., LTE/LTE-A), 5G NR, or similar communication technologies, the terms eNodeB, eNB, or gNB may be used to describe the network entity 14 or 20, though concepts described herein may be applied to other types of network entity in other types of communication technologies. For example, the wireless communications system 200 may be a 4G or a 5G NR network in which different types of network entity provide coverage for various geographical regions. For example, each network entity 14 or 20 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 12 with service subscriptions with the network provider. A small cell may cover a relatively smaller geographic area and may allow unrestricted access by UEs 12 with service subscriptions with the network provider, for example, and in addition to unrestricted access, may also provide restricted access by UEs 12 having an association with the small cell (e.g., UEs in a closed subscriber group (CSG), UEs for users in the home, and the like). A base station for a macro cell may be referred to as a macro base station. A base station for a small cell may be referred to as a small cell base station. A base station may support one or multiple (e.g., two, three, four, and the like) cells.

In some aspects, the core network 230 may communicate with the base stations or other network entity 14 or 20 via one or more backhaul links 232 (e.g., S1 interface, etc.). The network entity 14 or 20 may also communicate with one another, e.g., directly or indirectly via backhaul links 234 (e.g., X2 interface, etc.) and/or via backhaul links 232 (e.g., through core network 230).

In some examples, the UEs 12 may be dispersed throughout the wireless communications system 200, and each UE 12 may be stationary or mobile. The UE 12 may be referred to by those skilled in the art as a suitable terminology discussed herein. The UE 12 may be able to communicate with macro base stations, small cell base stations, relays, and the like. The UE 12 may be able to communicate over different access networks, such as cellular or other WWAN access networks, or WLAN access networks.

The communication links 225 (e.g., wireless communications 26 in FIG. 1) shown in wireless communications system 200 may include uplink transmissions from the UE 12 to the network entity 14 or 20, and/or downlink transmissions (e.g., an MIB or SIBs) from the network entity 14 or 20 to the UE 12. The downlink transmissions may also be called forward link transmissions while the uplink transmissions may also be called reverse link transmissions. The communication links 225 may carry transmissions of each hierarchical layer which, in some examples, may be multiplexed in the communication links 225. The UEs 12 may be configured to collaboratively communicate with multiple network entity 14 or 20 through, for example, MIMO, carrier aggregation (CA), Coordinated Multi-Point (CoMP), or other schemes. MIMO techniques use multiple antennas on the network entity 14 or 20 and/or multiple antennas on the UE 12 to transmit multiple data streams. The MIMO techniques may include closed-loop MIMO and/or open-loop MIMO scheme. Carrier aggregation (CA) may utilize two or more component carriers (CCs) on a same or different serving cell for data transmission. CoMP may include techniques for coordination of transmission and reception by a number of network entity 14 or 20 to improve overall transmission quality for UEs 12 as well as increasing network and spectrum utilization.

Figure 3:
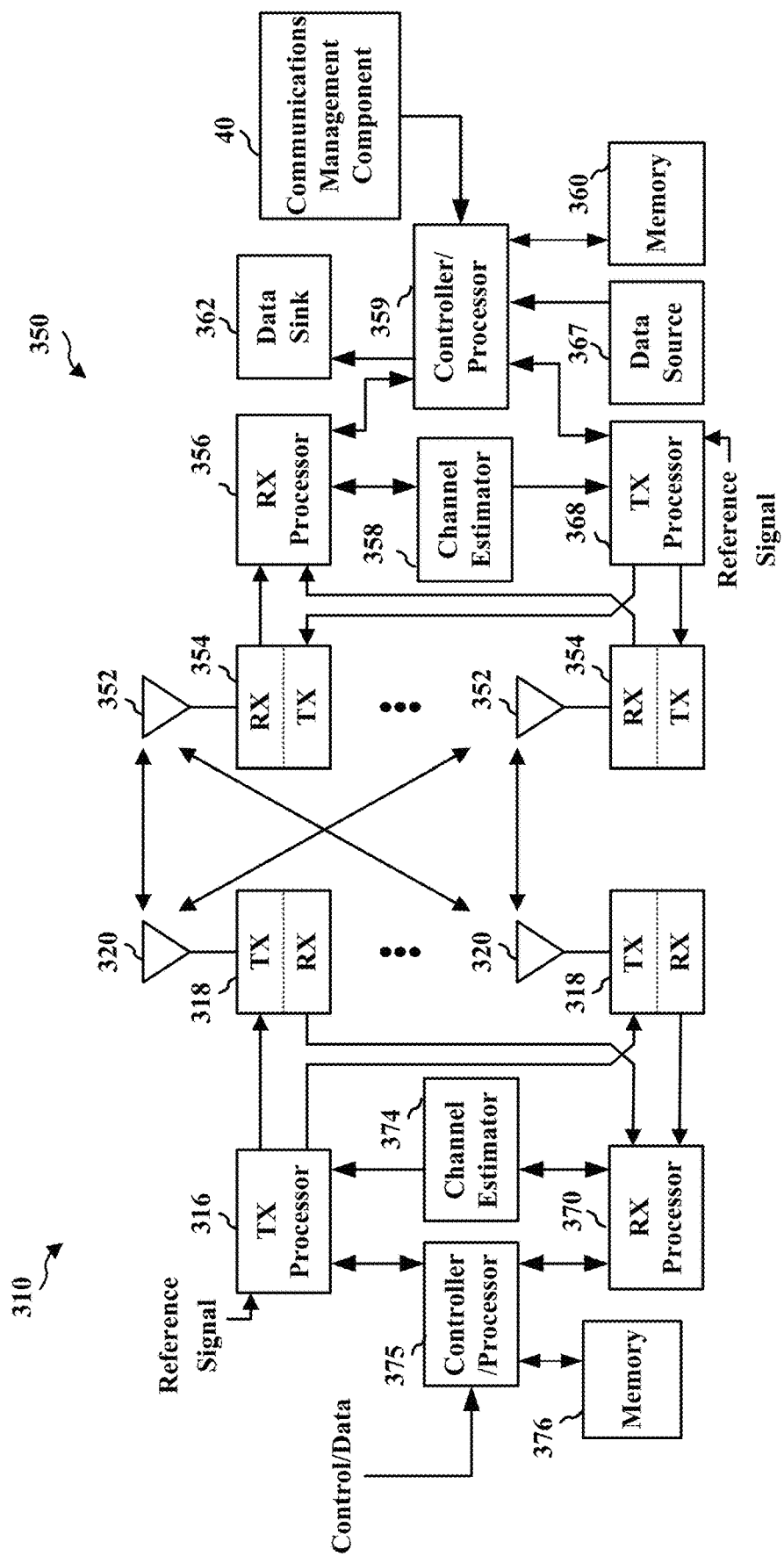
FIG. 3 is a block diagram illustrating an example of a UE communicating with a base station to perform operating mode and/or cell (re)selection procedures in an access network, according to one or more of the presently described aspects.

Referring to FIG. 3, a block diagram illustrates an example of a base station 310 (e.g., the network entity 14 or 20) in communication with a UE 350 (e.g., the UE 12) in an access network (e.g., the wireless communications system 100 and/or 200). In the downlink, upper layer packets from the core network are provided to a controller/processor 375. The controller/processor 375 implements the functionality of the L2 layer. In the downlink, the controller/processor 375 provides header compression, ciphering, packet segmentation and reordering, multiplexing between logical and transport channels, and radio resource allocations to the UE 350 based on various priority metrics. The controller/processor 375 is also responsible for hybrid automatic repeat request (HARQ) operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot signal) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

At the UE 350, each receiver 354RX receives a signal through a respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359.

The controller/processor 359 implements the L2 layer. The controller/processor may be associated with a memory 360 that stores program codes and data. The memory 360 may be referred to as a computer-readable medium. In the uplink, the controller/processor 359 provides demultiplexing (DEMUX) between transport and logical channels, packet reassembly, deciphering, header decompression, control signal processing to recover upper layer packets from the core network. The upper layer packets are then provided to a data sink 362, which represents all the protocol layers above the L2 layer. Various control signals may be provided to the data sink 362 for L3 processing. The controller/processor 359 may be responsible for error detection using an acknowledgement (ACK) and/or negative acknowledgement (NACK) protocol to support HARQ operations. In addition, the UE 350 may include a communications management component 40 configured to manage schemes of operating mode (re)selections and cell (re)selections of the base station 310. Though the communications management component 40 is shown as communicatively coupled with controller/processor 359, substantially any processor of the UE 350 may provide the functions of the communications management component 40 and/or the related components described herein (e.g., in conjunction with controller/processor 359, memory 360, or otherwise). For example, TX processor 368 and/or RX processor 356 may additionally or alternatively provide one or more functions of the communications management component 40, as described herein.

In the uplink, a data source 367 is used to provide upper layer packets to the controller/processor 359. The data source 367 represents all protocol layers above the L2 layer. Similar to the functionality described in connection with the downlink transmission by the base station 310, the controller/processor 359 implements the L2 layer for the user plane and the control plane by providing header compression, ciphering, packet segmentation and reordering, and multiplexing between logical and transport channels based on radio resource allocations by the base station 310. The controller/processor 359 is also responsible for HARQ operations, retransmission of lost packets, and signaling to the base station 310.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The uplink transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 may be associated with a memory 376 that stores program codes and data. The memory 376 may be referred to as a computer-readable medium. In the uplink, the controller/processor 375 provides demultiplexing (DEMUX) between transport and logical channels, packet reassembly, deciphering, header decompression, control signal processing to recover upper layer packets from the UE 350. Upper layer packets from the controller/processor 375 may be provided to the core network. The controller/processor 375 may be responsible for error detection using an ACK and/or NACK protocol to support HARQ operations.

Referring to FIG. 4, in an aspect, a UE (e.g., UE 12 in FIG. 1) in idle mode may search for both 4G LTE and 5G NR signals, detect one or more LTE cells and/or NR cells, and/or receive some minimum SIBs (e.g., MIB, SIB1, SIB2 from one or more LTE or NR cells). For example, the UE may receive system information (e.g., an MIB or SIBs) from one or more candidate cells including at least an LTE candidate cell or a 5G NR candidate cell. In some examples, the UE may determine or decide how to select an LTE cell or an NR cell and which operating mode should be used based on the received system information.

According to some aspects, the UE may select a candidate cell to camp on, and/or an operating mode to operate based on a table 400 in FIG. 4. In an aspect, the UE may determine the networks (e.g., LTE network and/or 5G NR network) in coverage area that the UE may communicate with one or more candidate cells in the networks. For example, a candidate cell in coverage area may require the candidate cell being suitable and/or meeting a cell selection (or reselection) criteria (e.g., S-criteria) where the signal quality of the signal(s) received from the candidate cell meets a condition or a threshold (e.g., equal or larger than a threshold). In some examples, the signal quality may be measured by RSRP, RSRQ, and/or RSSI.

In an aspect, the UE may detect and receive system information from one or more candidate cells in coverage. For example, the UE may be in a coverage area of one or more LTE candidate cells and/or one or more NR candidate cells. In some examples, the UE may identify or decode the received system information, and perform cell and mode selection accordingly (as shown in UE behavior in the table 400). For example, the UE may decode a received LTE SIB message from an LTE candidate cell and check whether there is an indication in the SIB (e.g., a "5G available" indication) indicating the existence of one or more nearby 5G NR cells (e.g., a 5G NR candidate cell that is proximate to the UE) and whether or not the base station that sent the LTE SIB can support DC. In another aspect, the UE may receive and decode a NR MIB message sent from a 5G NR candidate cell and check whether there is an indication (e.g., a "not-campable" flag) indicating whether or not the 5G NR candidate cell may be camped on. In some implementations, the indication(s) may be one or more bits, and may or may not be included in system information. In an example, "1" or "0" may be used as a one-bit indication, which indicates "Yes" or "No" as shown in the table 400 in FIG. 4.

In an example, the UE may be in a coverage area of one or more 5G NR candidate cells and no LTE cells are available to the UE. The UE may receive a NR MIB message including an indication (e.g., a "not-campable" flag) indicating that the 5GNR candidate cell cannot be camped on (e.g., the indication is a "Yes"). In this case, the UE may continue to search 4G LTE and/or 5GNR networks, in order to find a candidate cell (e.g., an LTE candidate cell or a 5GNR candidate cell) to be camped on.

In an aspect, the UE may receive 5G NR services with either an SA mode or an NSA mode. In other words, either the SA mode or the NSA mode is allowed for the UE. For example, the UE may be in a coverage area of at least an LTE candidate cell and a 5G NR candidate cell, and receive an LTE SIB message from the LTE candidate cell with an indication (e.g., a "5G available" indication) indicating the existence of at least the 5G NR candidate cell that is available and/or proximate to the UE, and the LTE candidate cell that sent the LTE SIB can support DC. In addition, the UE may receive a NR MIB message without a "not-campable" flag (e.g., cellBarred IE="notBarred") or with an indication that indicates the 5GNR candidate cell can be camped on. In this case, the UE may camp on either the LTE candidate cell or the 5G NR candidate cell, and the UE may need more input or considerations to choose a candidate cell to be camped on, which is discussed in more details below.

In an aspect, the UE may support voice service or may be a voice-centric UE, then the UE may use LTE to allow service continuity in UE mobility. For example, the UE may choose or select the LTE candidate cell and use the NSA mode. In another aspect, for a data-centric UE, the UE may compare the signal strengths of the LTE candidate cell versus the 5G NR candidate cell before making a cell and/or a mode selection. In an example, if the RSRP of the LTE candidate cell is more than the RSRP of the 5G NR candidate cell with an offset (e.g., LTE cell RSRP>NR cell RSRP+offset), the UE may select the LTE candidate cell with the NSA mode. For instance, if the LTE candidate cell has an RSRP equal to −70 dBm, the 5G NR candidate cell has an RSRP equal to −75 dBm with an offset equal to 3 dBm, then LTE cell RSRP (−70 dBm)>NR cell RSRP (−75 dBm)+offset (3 dBm). In this case, the UE may choose the LTE candidate cell with the NSA mode. Otherwise, the UE may select the 5G NR candidate cell with the SA mode. In an example, if the RSRP of the LTE candidate cell is less than RSRP of the 5G NR candidate cell with an offset (e.g., LTE cell RSRP<NR cell RSRP+offset), the UE may select the 5G NR candidate cell with the SA mode. For example, if the LTE candidate cell has an RSRP equal to −70 dBm, and the 5G NR candidate cell has an RSRP equal to −70 dBm with an offset equal to 3 dBm, then LTE cell RSRP (−70 dBm)<NR cell RSRP (−70 dBm)+offset (3 dBm). In this case, the UE may choose the 5G NR candidate cell with the SA mode.

In another aspect, cell selection criteria (S-criteria) and/or cell reselection criteria may be used for selecting or reselecting a candidate cell and an operating mode. In some examples, the UE may have different power consumptions (or other pre-determined parameters) for camping on an LTE candidate cell or a 5G NR candidate cell, and the power consumptions may depend on a particular paging cycle, a paging monitoring scheme, a pre-determined parameter, or measurements used in LTE or 5G NR. In an aspect, for a data-centric UE, if power consumptions for camping on an LTE candidate cell and a 5G NR candidate cell are different, the UE may choose a candidate cell with an operating mode that consumes less power. For example, if the LTE candidate cell has a paging cycle=1.28 second, and the 5G NR candidate cell has a paging cycle=2.56 second, the UE may select the 5G NR candidate cell (e.g., with SA mode) to save power.

Referring to FIG. 5A and FIG. 5B, in an aspect, once the UE (e.g., UE 12 in FIG. 1) has determined or selected an operation mode from, for example, an LTE mode, an SA mode, or an NSA mode, the UE may attempt to keep the same operating mode in cell reselection(s), as shown in tables 500 and 550. For example, the UE may reselect an LTE candidate cell and continue to use the NSA mode if the NSA mode is currently used, or reselect a 5G NR candidate cell and continue to use the SA mode if the SA mode is currently used. However, in case that a target or candidate cell cannot maintain the same operating mode, the UE may change mode and reselect another operating mode that is different from the currently used operating mode.

According to some aspects, the UE may reselect a target cell to camp on and choose an operating mode to operate based on tables 500 and 550. In an aspect, as shown in the tables 500 and 550, the UE may determine or identify the current operating mode (e.g., LTE mode, SA mode, or NSA mode) and/or the current cell (e.g., LTE cell or 5G NR cell) being camped on. In addition, the UE may identify or determine one or more target cells from a plurality of candidate cells for camping on or cell reselection. In some examples, the one or more target cells may include an LTE candidate cell, a 5G NR candidate cell, or both. In an aspect, the UE may receive and decode an LTE SIB message from the LTE candidate cell and check whether there is an indication (e.g., a "5G available" indication) in the SIB indicating the existence of one or more nearby 5G NR cells (e.g., a 5G NR candidate cell that is proximate to the UE) and whether or not the LTE candidate cell can support DC. In some cases, the UE may receive and decode an NR MIB message sent from the 5G NR candidate cell, and check whether there is an indication (e.g., a "not-campable" flag) indicating whether or not the 5G NR candidate cell may be camped on. In some implementations, the indication(s) may be one or more bits, and may or may not be included in system information. In an example, "1" or "0" may be used as a one-bit indication, which indicates "Yes" or "No" as shown in the tables 500 and/or 550.

In some aspects, as shown in the tables 500 and/or 550, the UE may reselect a target cell to be camped on from the one or more candidate cells, and choose an operating mode from the LTE mode, the SA mode, and/or the NSA mode, based on the current operating mode of the UE, the target cell(s) of the UE, and/or the received system information or indication(s) from the one or more candidate cells. In some examples, the UE may decode the received system information, and check whether there is a "5G available" indication (e.g., upperLayerindication IE of the selected PLMN) in an SIB from an LTE candidate cell, and/or whether there is a "not-campable" flag (e.g., cellBarred IE="barred") in an MIB from a 5G NR candidate cell.

In some examples, as shown in the tables 500 and/or 550, at least an LTE candidate cell and a 5G NR candidate cell may meet respective cell reselection condition(s) at about the same time. For example, the respective cell reselection condition(s) may include the RSRP of the LTE candidate (or neighbor) cell being greater than a first threshold, and the RSRP of the 5G NR candidate (or neighbor) cell being greater than a second threshold, and the first threshold and the second threshold may be pre-determined or pre-configured (e.g., by the UE). In some cases, the respective cell reselection conditions may be considered by the UE at about the same time (e.g., within the same or the next measurement period). In an example, a measurement period may be 1.28 second, or equal to a paging cycle of a target or candidate cell.

In an aspect, as shown in the tables 500 and/or 550, the UE may target to camp on a 5G NR candidate cell. In an example, the UE may receive a NR MIB message including an indication (e.g., a "not-campable" flag) that indicates the 5G NR candidate cell cannot be camped on (e.g., the indication is a "Yes"). In this situation, the UE may continue to search 4G LTE and/or 5G NR networks, in order to find another candidate cell (e.g., LTE candidate cell or 5G NR candidate cell) to be camped on.

In another aspect, as shown in the tables 500 and/or 550, the UE may be in a coverage area of at least an LTE candidate cell and a 5G NR candidate cell, and receive an LTE SIB message from the LTE candidate cell with an indication (e.g., "5G available" indication) indicating the existence of at least the 5G NR candidate cell that is available and/or proximate to the UE, and the LTE candidate cell that sent the LTE SIB can support DC. In addition, UE may receive a NR MIB message without a "not-campable" flag (e.g., cellBarred IE="notBarred") or with an indication that indicates the 5G NR candidate cell can be camped on. In this case, the UE may camp on either the LTE candidate cell or the 5G NR candidate cell, and the UE may attempt to keep the same operating mode when performing the cell reselection(s), as shown in tables 500 and 550. For example, the UE may reselect an LTE candidate cell and continue to use the NSA mode if the NSA mode is currently used, or reselect a 5G NR candidate cell and continue to use the SA mode if the SA mode is currently used. In another example, when the UE currently operates in the LTE mode and may camp on either the LTE candidate cell or the 5G NR candidate cell, the UE may need more input or considerations to choose a target cell to be camped on, which is discussed in more details below.

In an aspect, the UE may support a voice service or may be a voice-centric UE, then the UE may use LTE to allow service continuity in UE mobility. For example, the UE may choose or reselect the LTE candidate cell and use the NSA mode. In another aspect, for a data-centric UE, the UE may compare the signal strengths of the LTE candidate cell versus the 5G NR candidate cell before making a cell and/or a mode reselection. In an example, if the RSRP of the LTE candidate cell is more than the RSRP of the 5G NR candidate cell with an offset (e.g., LTE cell RSRP>NR cell RSRP+offset), the UE may reselect the LTE candidate cell with the NSA mode. For example, if the LTE candidate cell has an RSRP equal to −70 dBm, and the 5G NR candidate cell has an RSRP equal to −75 dBm with an offset equal to 3 dBm, then the LTE cell RSRP (−70 dBm)>NR cell RSRP (−75 dBm)+offset (3 dBm). In this case, the UE may choose or reselect the LTE candidate cell with the NSA mode. Otherwise, the UE may reselect the 5G NR candidate cell with the SA mode. In an example, if the RSRP of the LTE candidate cell is less than the RSRP of the 5G NR candidate cell with an offset (e.g., LTE cell RSRP<NR cell RSRP+offset), the UE may reselect the 5G NR candidate cell with the SA mode. For example, if the LTE candidate cell has an RSRP equal to −70 dBm, and the 5G NR candidate cell has an RSRP equal to −70 dBm with an offset equal to 3 dBm, then LTE cell RSRP (−70 dBm)<NR cell RSRP (−70 dBm)+offset (3 dBm). In this case, the UE may choose or reselect the 5G NR candidate cell with the SA mode.

In another aspect, cell reselection criteria may be used for reselecting a candidate cell and an operating mode. In some examples, the UE may have different power consumptions (or other pre-determined parameters) for camping on an LTE candidate cell or a 5G NR candidate cell, and the power consumptions may depend on a particular paging cycle, a paging monitoring scheme, a pre-determined parameter, or measurements used in LTE or 5G NR. In an aspect, for a data-centric UE, if power consumptions for camping on an LTE candidate cell and a 5G NR candidate cell are different, the UE may choose or reselect a candidate cell with an operating mode that consumes less power. For example, if the LTE candidate cell has a paging cycle=1.28 second, and the 5G NR candidate cell has a paging cycle=2.56 second, the UE may reselect the 5G NR candidate cell (e.g., with SA mode) to save power.

Figure 6B:

Referring to FIG. 6A and FIG. 6B, in an aspect, once the UE (e.g., the UE 12 in FIG. 1) has determined or selected an operation mode from, for example, an LTE mode, an SA mode, or an NSA mode, the UE may dynamically choose an operating mode in cell reselection(s), as shown in tables 600 and 650. For example, in some situations, the UE may reselect an LTE candidate cell if the NSA mode is a suitable or better operating mode, or reselect a 5G NR candidate cell if the SA mode is a suitable or better operating mode. However, if the UE reselects a target or candidate cell and is unable to operate in a target operating mode (e.g., suitable or better operating mode), the UE may stay in the same operating mode. In some examples, the UE may operate in a suitable or better operating mode when the operating mode includes better performance options (e.g., power efficient or low latency), utilizes more 5G NR services, and/or includes abilities to choose a target cell based on the UE capability and/or requested service type(s) (e.g., voice-centric or data-centric services).

According to some aspects, the UE may reselect a target or candidate cell to camp on and choose an operating mode to operate based on tables 600 and 650. In an aspect, as shown in the tables 600 and 650, the UE may determine or identify the current operating mode (e.g., LTE mode, SA mode, or NSA mode) and/or the current cell (e.g., LTE cell or 5G NR cell) being camped on by the UE. In addition, the UE may identify or determine one or more target cells from a plurality of candidate cells for camping on or cell reselection. In some examples, the one or more target cells may include an LTE candidate cell, a 5G NR candidate cell, or both. In an aspect, the UE may receive and decode an LTE SIB message from the LTE candidate cell and check whether there is an indication in the SIB (e.g., "5G available" indication) indicating the existence of one or more nearby 5G NR cells (e.g., 5G NR candidate cell proximate to UE) and whether or not the LTE candidate cell can support DC. In some cases, the UE may receive and decode a NR MIB message sent from the 5G NR candidate cell, and check whether there is an indication (e.g., a "not-campable" flag) indicating whether or not the 5G NR candidate cell may be camped on. In some implementations, the indication(s) may be one or more bits, and may or may not be included in system information. In an example, "1" or "0" may be used as a one-bit indication, which indicates "Yes" or "No" as shown in the tables 600 and/or 650.

In some aspects, as shown in the tables 600 and/or 650, the UE may reselect a target cell to be camped on from the one or more candidate cells, and choose an operating mode from the LTE mode, the SA mode, and/or the NSA mode, based on the current operating mode of the UE, the target cell(s) of the UE, and/or the received system information or indication(s) from the one or more candidate cells. In some examples, the UE may decode the received system information, and check whether there is a "5G available" indication, i.e. upperLayerindication IE of the selected PLMN, in an SIB from an LTE candidate cell, and/or whether there is a "not-campable" flag, i.e. cellBarred IE='barred', in an MIB from a 5G NR candidate cell.

In some examples as shown in the tables 600 and/or 650, at least an LTE candidate cell and a 5G NR candidate cell may meet respective cell reselection condition(s) at about same time. For example, the respective cell reselection condition(s) may include the RSRP of the LTE candidate (or neighbor) cell being greater than a first threshold, and the RSRP of the 5G NR candidate (or neighbor) cell being greater than a second threshold, where the first threshold and the second threshold may be pre-determined or pre-configured (e.g., by the UE). In some cases, the respective cell reselection conditions may be considered by the UE at about the same time (e.g., within the same or the next measurement period). In an example, a measurement period may be 1.28 second, or equal to a paging cycle of a target or candidate cell.

In an aspect, in the tables 600 and/or 650, the UE may target to camp on a 5G NR candidate cell. In an example, the UE may receive a NR MIB message including an indication (e.g., "not-campable" flag) that indicates the 5G NR candidate cell cannot be camped on (e.g., the indication is a "Yes"). In this situation, the UE may continue to search 4G LTE and/or 5G NR networks, in order to find another candidate cell (e.g., LTE candidate cell or 5G NR candidate cell) to be camped on.

In another aspect, in the tables 600 and/or 650, the UE may be in a coverage area of at least an LTE candidate cell and a 5G NR candidate cell, and receive an LTE SIB message from the LTE candidate cell with an indication (e.g., "5G available" indication) indicating the existence of at least the 5G NR candidate cell that is available and/or proximate to the UE, and the LTE candidate cell that sent the LTE SIB can support DC. In addition, the UE may receive a NR MIB message without a "not-campable" flag, i.e. cellBarred IE='notBarred', or with an indication that indicates the 5G NR candidate cell can be camped on. In this case, the UE may camp on either the LTE candidate cell or the 5G NR candidate cell, and the UE may attempt to reselect a suitable or better operating mode when performing the cell reselection(s), as shown in tables 600 and 650.

In an aspect, to choose a suitable or better operating mode and/or a proper target cell to be camped on, the UE may determine or identify what type of service the UE is using or targets to use. For example, the UE may be a voice-centric UE, then the UE may use LTE to allow service continuity in UE mobility. In this case, the UE may choose or reselect the LTE candidate cell and use the NSA mode. In another aspect, for a data-centric UE, the UE may compare the signal strengths of the LTE candidate cell versus the 5G NR candidate cell before making a cell and/or a mode reselection. In an example, if the RSRP of the LTE candidate cell is more than the RSRP of the 5G NR candidate cell with an offset (e.g., LTE cell RSRP>NR cell RSRP+offset), the UE may reselect the LTE candidate cell with the NSA mode. For instance, if the LTE candidate cell has an RSRP equal to −70 dBm, and the 5G NR candidate cell has an RSRP equal to −75 dBm with an offset equal to 3 dBm, then LTE cell RSRP (−70 dBm)>NR cell RSRP (−75 dBm)+offset (3 dBm). In this case, the UE may choose or reselect the LTE candidate cell with the NSA mode. Otherwise, the UE may reselect the 5G NR candidate cell with the SA mode. In an example, if the RSRP of the LTE candidate cell is less than the RSRP of the 5G NR candidate cell with an offset (e.g., LTE cell RSRP<NR cell RSRP+offset), the UE may reselect the 5G NR candidate cell with the SA mode. For instance, the LTE candidate cell has an RSRP equal to −70 dBm, and the 5G NR candidate cell has an RSRP equal to −70 dBm with an offset equal to 3 dBm, then LTE cell RSRP (−70 dBm)<NR cell RSRP (−70 dBm)+offset (3 dBm). In this case, the UE may choose or reselect the 5G NR candidate cell with the SA mode.

In another aspect, cell reselection criteria may be used for dynamically reselecting a candidate cell and/or an operating mode. In some examples, the UE may have different power consumptions (or other pre-determined parameters) for camping on an LTE candidate cell or a 5G NR candidate cell, and the power consumptions may depend on a particular paging cycle, a paging monitoring scheme, a pre-determined parameter, or measurements used in LTE or 5G NR. In an aspect, for a data-centric UE, if power consumptions for camping on an LTE candidate cell and a 5G NR candidate cell are different, the UE may choose or reselect a candidate cell with an operating mode that consumes less power. For example, if the LTE candidate cell has a paging cycle=1.28 second, and the 5G NR candidate cell has a paging cycle=2.56 second, the UE may reselect the 5G NR candidate cell (e.g., with SA mode) to save power.

Figure 7:
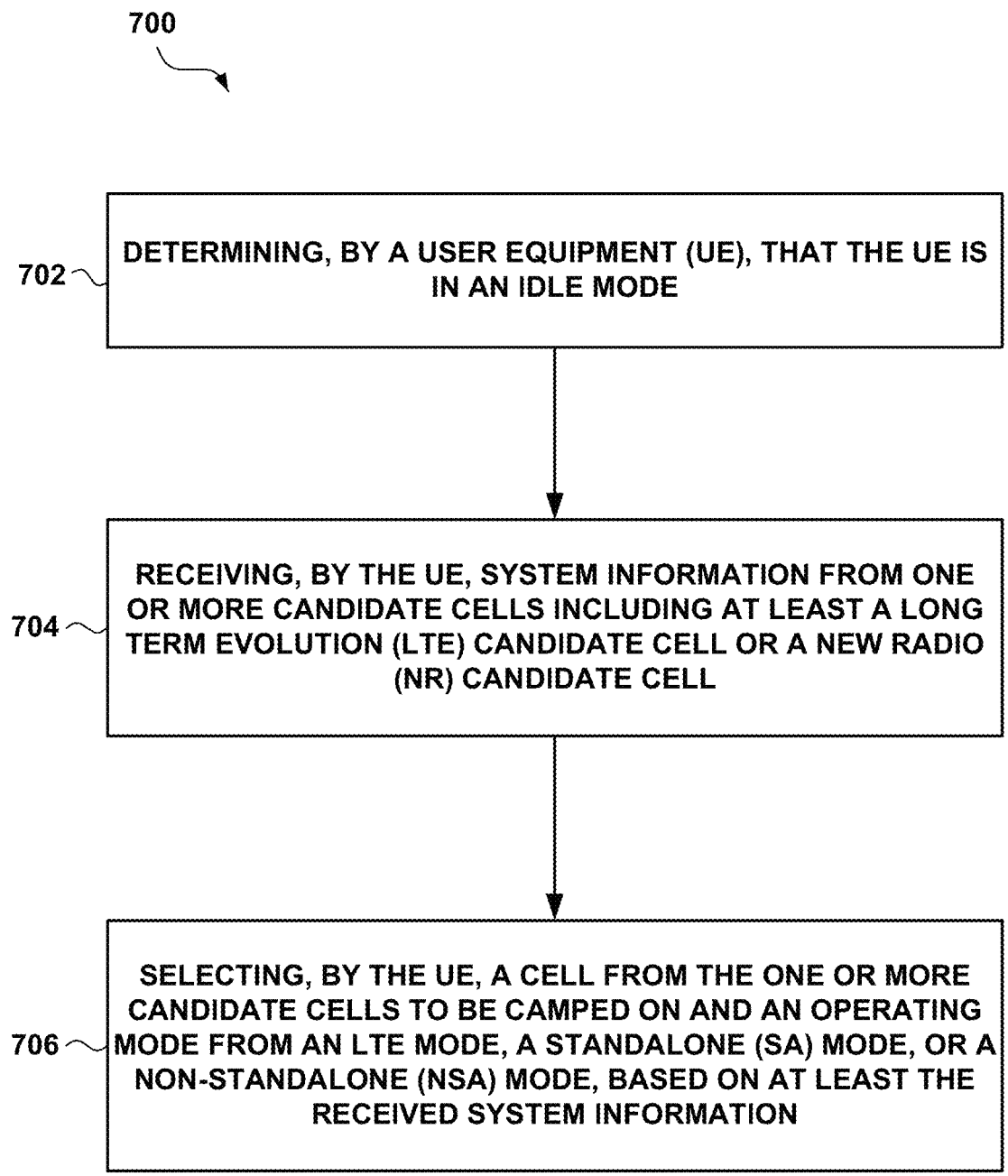
FIG. 7 is a flow chart of an example method for managing operating mode and cell selection, according to one or more of the presently described aspects.

Referring to FIG. 7, in an operational aspect, a UE, such as UE 12 in FIG. 1, may perform one or more aspects of a method 700 for managing operating mode selection and cell selection procedures in a wireless communications system (e.g., 4G or 5G NR system). For example, one or more of the one or more processors 103, the memory 130, the modem 108, the transceiver 106, the communications management component 40, the operating mode management component 42, the system information management component 44, the cell management component 46, the service component 48, or the signal and power management component 50 may be configured to perform aspects of the method 700.

In an aspect, at block 702, the method 700 may include determining, by a UE, that the UE is in an idle mode. In an aspect, for example, the communications management component 40, and/or the operating mode management component 42, e.g., in conjunction with one or more of the one or more processors 103, the memory 130, the modem 108, and/or the transceiver 106, may be configured to determine that the UE 12 is in an idle mode. In an example, the communications management component 40 (or another component) may verify whether the UE 12 has an Radio Resource Control (RRC) connection, and if the UE 12 does not have an RRC connection, the UE 12 is determined to be in idle mode.

In another aspect, at block 704, the method 700 may include receiving, by the UE, system information from one or more candidate cells including at least an LTE candidate cell or a NR candidate cell. In an aspect, for example, the communications management component 40, and/or the system information management component 44, e.g., in conjunction with one or more of the one or more processors 103, the memory 130, the modem 108, and/or the transceiver 106, may be configured to detect, receive, and/or decode system information (e.g., an LTE SIB or a NR MIB) from one or more candidate cells (e.g., network entity 14 or network entity 20) that may include at least an LTE candidate cell or an NR candidate cell. In some examples, the system information is received in an SIB from an LTE candidate cell and may include at least an indication indicating the existence of at least the NR candidate cell and support of dual connectivity. In an aspect, the system information may include a list of one or more frequencies supported by the NR candidate cell. In another aspect, the system information may be received in an MIB from the NR candidate cell and may (or may not) include an indication indicating that the NR candidate cell cannot be camped on.

In an aspect, at block 706, the method 700 may include selecting, by the UE, a cell from the one or more candidate cells to be camped on and an operating mode from an LTE mode, an SA mode, or a NSA mode, based on at least the received system information. In an aspect, for example, the communications management component 40, the operating mode management component 42, the system information management component 44, and/or the cell management component 46, e.g., in conjunction with one or more of the one or more processors 103, the memory 130, the modem 108, and/or the transceiver 106, may be configured to select a cell from one or more candidate cells (e.g., network entity 14 or network entity 20) and choose an operating mode (from an LTE mode, an SA mode, or a NSA mode) for the UE 12, based on at least the received system information at block 704.

Figure 8:
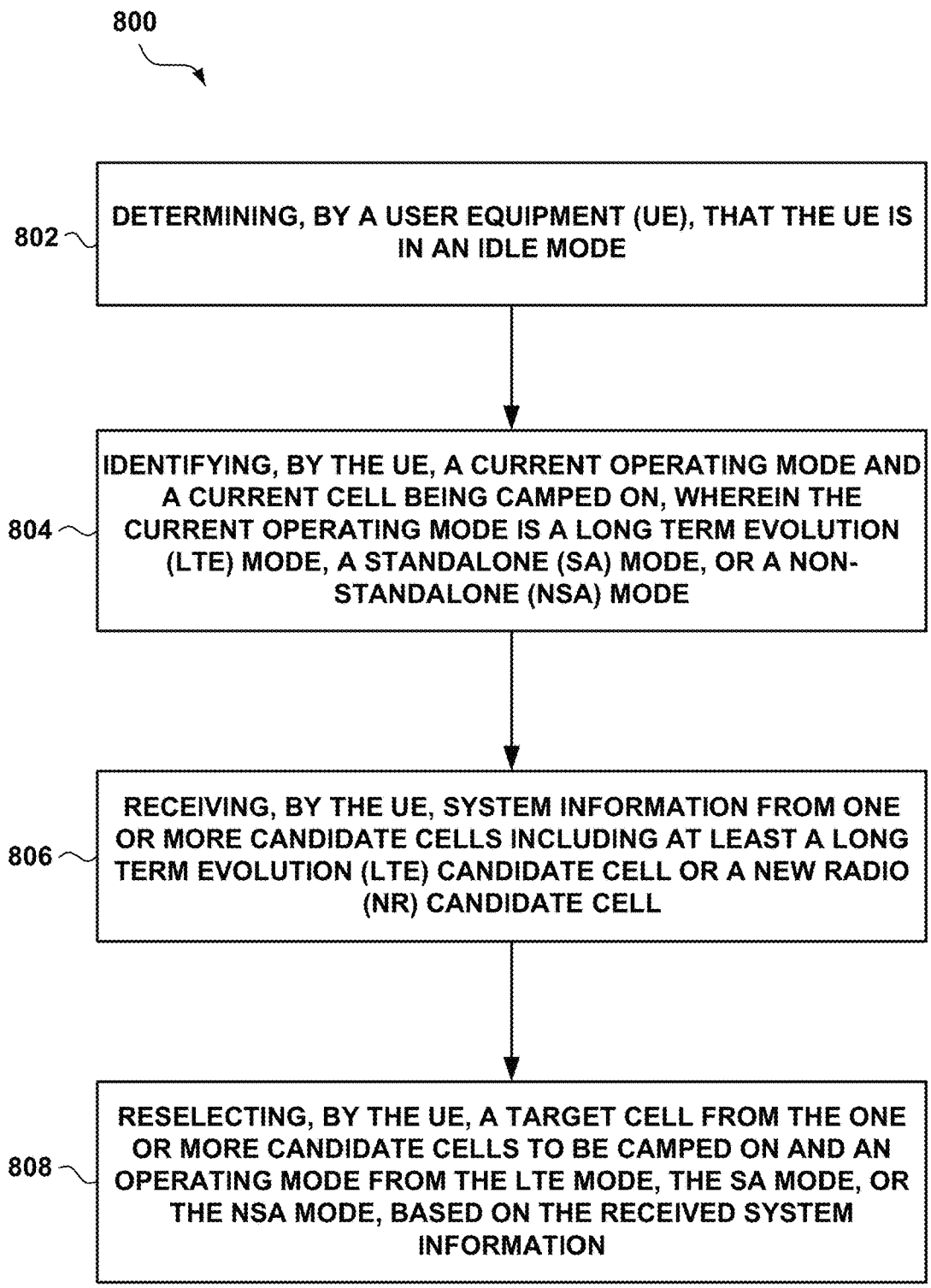
FIG. 8 is a flow chart of an example method for managing operating mode and cell reselection, according to one or more of the presently described aspects.

Referring to FIG. 8, in an operational aspect, a UE, such as UE 12 in FIG. 1, may perform one or more aspects of a method 800 for managing operating mode and cell reselection procedures in a wireless communications system (e.g., 4G or 5G NR system). For example, one or more of the one or more processors 103, the memory 130, the modem 108, the transceiver 106, the communications management component 40, the operating mode management component 42, the system information management component 44, the cell management component 46, the service component 48, and/or the signal and power management component 50 may be configured to perform aspects of the method 800.

In an aspect, at block 802, the method 800 may include determining, by a UE, that the UE is in an idle mode. In an aspect, for example, the communications management component 40, and/or the operating mode management component 42, e.g., in conjunction with one or more of the one or more processors 103, the memory 130, the modem 108, and/or the transceiver 106, may be configured to determine that the UE 12 is in an idle mode. In an example, the communications management component 40 (or another component) may verify whether the UE 12 has an Radio Resource Control (RRC) connection, and if the UE 12 does not have an RRC connection, the UE 12 is determined to be in idle mode.

In another aspect, at block 804, the method 800 may include identifying, by the UE, a current operating mode and a current cell being camped on, wherein the current operating mode is an LTE mode, an SA mode, or a NSA mode. In an aspect, for example, the communications management component 40, the operating mode management component 42, the cell management component 46, e.g., in conjunction with one or more of the one or more processors 103, the memory 130, the modem 108, and/or the transceiver 106, may be configured to identify the current operating mode (e.g., LTE mode, SA mode, or NSA mode) and the current cell (e.g., an LTE candidate cell or a NR candidate cell) being camped on by the UE 12.

In an aspect, at block 806, the method 800 may include receiving, by the UE, system information from one or more candidate cells including at least an LTE candidate cell or a NR candidate cell. In an aspect, for example, the communications management component 40, and/or the system information management component 44, e.g., in conjunction with one or more of the one or more processors 103, the memory 130, the modem 108, and/or the transceiver 106, may be configured to detect, receive, and/or decode system information (e.g., an LTE SIB or a NR MIB) from one or more candidate cells (e.g., network entity 14 or network entity 20) that may include at least an LTE candidate cell or a NR candidate cell. In some examples, the system information is received in an SIB from an LTE candidate cell and may include at least an indication indicating the existence of at least the NR candidate cell and support of dual connectivity. In an aspect, the system information may include a list of one or more frequencies supported by the NR candidate cell. In another aspect, the system information may be received in an MIB from the NR candidate cell and may (or may not) include an indication indicating that the NR candidate cell cannot be camped on.

In another aspect, at block 808, the method 800 may include reselecting, by the UE, a target cell from the one or more candidate cells to be camped on and an operating mode from the LTE mode, the SA mode, or the NSA mode, based on the received system information. In an aspect, for example, the communications management component 40, the operating mode management component 42, the system information management component 44, and/or the cell management component 46, e.g., in conjunction with one or more of the one or more processors 103, the memory 130, the modem 108, and/or the transceiver 106, may be configured to reselect a target cell from one or more candidate cells (e.g., network entity 14 or network entity 20) and choose an operating mode (from an LTE mode, an SA mode, or a NSA mode) for the UE 12, based on at least the received system information at block 806.

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Several aspects of a telecommunications system have been presented with reference to a 4G or 5G NR system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing LTE (in frequency division duplex (FDD), time division duplex (TDD), or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Moreover, nothing disclosed herein is intended to be dedicated to the public regardless of whether such disclosure is explicitly recited in the claims.

What is claimed is:

1. A method of wireless communications, comprising:
   determining, by a user equipment (UE), that the UE is in an idle mode;
   receiving, by the UE while in the idle mode, system information from candidate cells including at least a Long Term Evolution (LTE) candidate cell and a New Radio (NR) candidate cell, wherein the system information includes an indication of one or more of NR capabilities of the LTE candidate cell or camp capabilities of the NR candidate cell;
   determining, by the UE, power consumptions for camping on the candidate cells;
   comparing, by the UE, the power consumptions for camping on the LTE candidate cell and the NR candidate cell; and
   selecting, by the UE, a cell from the candidate cells to be camped on and an operating mode from an LTE mode, a Standalone (SA) mode, or a Non-standalone (NSA) mode, based on at least the system information and the power consumptions being compared.

2. The method of claim 1, wherein:
   the LTE mode is selected when the UE camps on the LTE candidate cell and no NR candidate cells are available for the UE,
   the SA mode is selected when the UE camps on the NR candidate cell, and
   the NSA mode is selected when the UE is able to connect to the LTE candidate cell as a Master Cell Group (MCG) and the NR candidate cell as a Secondary Cell Group (SCG) with dual connectivity (DC).

3. The method of claim 1, wherein:
   the LTE mode is selected when the UE camps on the LTE candidate cell, monitors at least LTE paging messages, and does not display a fifth generation (5G) icon,
   the SA mode is selected when the UE camps on the NR candidate cell, monitors at least NR paging messages, and displays the 5G icon, or
   the NSA mode is selected when the UE camps on the LTE candidate cell, monitors at least the LTE paging messages, and displays the 5G icon.

4. The method of claim 1, wherein the system information is received in a system information block (SIB) from the LTE candidate cell and further includes at least an indication indicating an existence of at least the NR candidate cell and support of dual connectivity (DC).

5. The method of claim 4, wherein the system information further includes a list of one or more frequencies supported by the NR candidate cell.

6. The method of claim 1, further comprising:
   determining, by the UE, that the NR candidate cell is in a secondary cell group (SCG) with dual connectivity (DC) based on the system information, wherein the system information is received in a master information block (MIB) from the NR candidate cell and the indication indicates that the NR candidate cell cannot be camped on.

7. The method of claim 1, further comprising:
   determining, by the UE, that the NR candidate cell can be camped on based on the system information, wherein the system information is received in a master information block (MIB) from the NR candidate cell without the indication indicating that the NR candidate cell cannot be camped on.

8. The method of claim 1, wherein the selecting comprises selecting the LTE candidate cell and the NSA mode in response to a determination that the UE is able to connect to the NR candidate cell with either the SA mode or the NSA mode and supports voice-centric service.

9. The method of claim 1, further comprising:
   determining, by the UE, that the UE is able to connect to the NR candidate cell with either the SA mode or the NSA mode and supports data-centric service; and
   comparing, by the UE, signal strengths of the LTE candidate cell and the NR candidate cell, wherein the cell and the operating mode are selected based on the signal strengths being compared.

10. The method of claim 1, further comprising:
    determining, by the UE, that the UE is able to connect to the NR candidate cell with either the SA mode or the NSA mode and supports data-centric service.

11. A method of wireless communications, comprising:
    determining, by a user equipment (UE), that the UE is in an idle mode;
    identifying, by the UE while in the idle mode, a current operating mode and a current cell being camped on, wherein the current operating mode is a Long Term Evolution (LTE) mode, a Standalone (SA) mode, or a Non-standalone (NSA) mode;
    receiving, by the UE, system information from candidate cells including at least a Long Term Evolution (LTE) candidate cell and a New Radio (NR) candidate cell, wherein the system information includes an indication of one or more of NR capabilities of the LTE candidate cell or camp capabilities of the NR candidate cell;
    determining, by the UE, power consumptions for camping on the candidate cells;
    comparing, by the UE, the power consumptions for camping on the LTE candidate cell and the NR candidate cell; and
    reselecting, by the UE, a target cell from the candidate cells to be camped on and an operating mode from the LTE mode, the SA mode, or the NSA mode, based on the system information and the power consumptions being compared.

12. The method of claim 11, wherein the operating mode is reselected to be the current operating mode.

13. The method of claim 11, wherein the operating mode is reselected to be different from the current operating mode in response to a determination that the target cell cannot maintain a same operating mode.

14. The method of claim 11, wherein the system information is received in a system information block (SIB) from the LTE candidate cell and further includes at least an indication indicating an existence of at least the NR candidate cell and support of dual connectivity (DC).

15. The method of claim 14, wherein the system information further includes a list of one or more frequencies supported by the NR candidate cell.

16. The method of claim 11, further comprising:
    determining, by the UE, that the NR candidate cell is in a secondary cell group (SCG) with dual connectivity (DC) based on the system information, wherein the system information is received in a master information block (MIB) from the NR candidate cell and the indication indicates that the NR candidate cell cannot be camped on.

17. The method of claim 11, further comprising:
    determining, by the UE, that the NR candidate cell can be camped on based on the system information, wherein the system information is received in a master information block (MIB) from the NR candidate cell without the indication indicating that the NR candidate cell cannot be camped on.

18. The method of claim 11, wherein the reselecting comprises reselecting the LTE candidate cell as the target cell and the NSA mode in response to a determination that the UE is able to connect to the NR candidate cell with either the SA mode or the NSA mode and supports voice-centric service.

19. The method of claim 11, further comprising:
determining, by the UE, that the UE is able to connect to the NR candidate cell with either the SA mode or the NSA mode and supports data-centric service; and
comparing, by the UE, signal strengths of the LTE candidate cell and the NR candidate cell, wherein the target cell and the operating mode are reselected based on the signal strengths being compared.

20. The method of claim 11, further comprising:
determining, by the UE, that the UE is able to connect to the NR candidate cell with either the SA mode or the NSA mode and supports data-centric service.

21. An apparatus for wireless communications, comprising:
a receiver configured to receive one or more signals;
a memory configured to store instructions; and
at least one processor communicatively coupled with the receiver and the memory, wherein the at least one processor is configured to execute the instructions to:
determine that the apparatus is in an idle mode;
receive, via the receiver while the apparatus is in the idle mode, system information from one or more candidate cells including at least a Long Term Evolution (LTE) candidate cell and a New Radio (NR) candidate cell, wherein the system information includes an indication of one or more of NR capabilities of the LTE candidate cell or camp capabilities of the NR candidate cell;
determine power consumptions for camping on the candidate cells;
compare the power consumptions for camping on the LTE candidate cell and the NR candidate cell; and
select a cell from the candidate cells to be camped on and an operating mode from an LTE mode, a Standalone (SA) mode, or a Non-standalone (NSA) mode, based on at least the system information and the power consumptions being compared.

22. The apparatus of claim 21, wherein:
the LTE mode is selected when the apparatus camps on the LTE candidate cell and no NR candidate cells are available for the apparatus,
the SA mode is selected when the apparatus camps on the NR candidate cell, and
the NSA mode is selected when the apparatus is able to connect to the LTE candidate cell as a Master Cell Group (MCG) and the NR candidate cell as a Secondary Cell Group (SCG) with dual connectivity (DC).

23. The apparatus of claim 21, wherein:
the LTE mode is selected when the apparatus camps on the LTE candidate cell, monitors at least LTE paging messages, and does not display a fifth generation (5G) icon,
the SA mode is selected when the apparatus camps on the NR candidate cell, monitors at least NR paging messages, and displays the 5G icon, or
the NSA mode is selected when the apparatus camps on the LTE candidate cell, monitors at least the LTE paging messages, and displays the 5G icon.

24. The apparatus of claim 21, wherein the system information is received in a system information block (SIB) from the LTE candidate cell and further includes at least an indication indicating an existence of at least the NR candidate cell and support of dual connectivity (DC).

25. The apparatus of claim 24, wherein the system information further includes a list of one or more frequencies supported by the NR candidate cell.

26. An apparatus for wireless communications, comprising:
a receiver configured to receive one or more signals;
a memory configured to store instructions; and
at least one processor communicatively coupled with the receiver and the memory, wherein the at least one processor is configured to execute the instructions to:
determine that the apparatus is in an idle mode;
identify, while the apparatus is in the idle mode, a current operating mode and a current cell being camped on, wherein the current operating mode is a Long Term Evolution (LTE) mode, a Standalone (SA) mode, or a Non-standalone (NSA) mode;
receive, via the receiver, system information from candidate cells including at least a Long Term Evolution (LTE) candidate cell and a New Radio (NR) candidate cell, wherein the system information includes an indication of one or more of NR capabilities of the LTE candidate cell or camp capabilities of the NR candidate cell;
determine power consumptions for camping on the candidate cells;
compare the power consumptions for camping on the LTE candidate cell and the NR candidate cell; and
reselect a target cell from the more candidate cells to be camped on and an operating mode from the LTE mode, the SA mode, or the NSA mode, based on the system information and the power consumptions being compared.

27. The apparatus of claim 26, wherein the operating mode is reselected to be the current operating mode.

28. The apparatus of claim 26, wherein the operating mode is reselected to be different from the current operating mode in response to a determination that the target cell cannot maintain a same operating mode.

29. The apparatus of claim 26, wherein the system information is received in a system information block (SIB) from the LTE candidate cell and further includes at least an indication indicating an existence of at least the NR candidate cell and support of dual connectivity (DC).

30. The apparatus of claim 29, wherein the system information further includes a list of one or more frequencies supported by the NR candidate cell.

* * * * *